US 6,622,299 B1

(12) United States Patent
Santosuosso et al.

(10) Patent No.: US 6,622,299 B1
(45) Date of Patent: Sep. 16, 2003

(54) COMPUTER SYSTEM, PROGRAM PRODUCT AND METHOD FOR DYNAMICALLY PROVIDING AN INDICATION TO A PROGRAMMER OF THE EFFICIENCY OF A PROGRAM THAT IS BEING WRITTEN

(75) Inventors: John Matthew Santosuosso, Rochester, MN (US); Dale Dean Weber, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/348,089

(22) Filed: Jul. 6, 1999

(51) Int. Cl.[7] ................................................. G06F 9/44
(52) U.S. Cl. .................. 717/127; 717/128; 717/129; 717/130; 717/131
(58) Field of Search ..................... 714/38; 717/127–131

(56) References Cited

U.S. PATENT DOCUMENTS

| 5,867,643 | A | * | 2/1999 | Sutton | 710/15 |
| 5,887,167 | A | * | 3/1999 | Sutton | 709/106 |
| 5,920,719 | A | * | 7/1999 | Sutton et al. | 717/4 |
| 6,161,200 | A | * | 12/2000 | Rees et al. | 714/38 |
| 6,247,170 | B1 | * | 6/2001 | Giroux | 717/4 |

OTHER PUBLICATIONS

Waddell et al., "Visualizing the Performance of Higher–Order Programs," ACM, pp. 75–82, 1998.*

* cited by examiner

Primary Examiner—Gregory Morse
Assistant Examiner—Ted T. Vo
(74) Attorney, Agent, or Firm—Wood, Herron & Evans

(57) ABSTRACT

A method, apparatus and program product provides an indication to a programmer of the efficiency of a created program and comprises monitoring of insertion and deletion of one or more functions within the program and determining a performance statistic for the function which is indicative of the efficiency of the function. A humanly perceptible output is provided to the programmer which is reflective of the performance statistic of the function to provide an indication to the programmer related to the efficiency of the created program.

32 Claims, 2 Drawing Sheets

COMPUTER SYSTEM, PROGRAM PRODUCT AND METHOD FOR DYNAMICALLY PROVIDING AN INDICATION TO A PROGRAMMER OF THE EFFICIENCY OF A PROGRAM THAT IS BEING WRITTEN

FIELD OF THE INVENTION

This invention is generally related to computers and computer software. More specifically, the invention is related to dynamically providing an indication to a programmer of the efficiency of a program that is being written.

BACKGROUND OF THE INVENTION

Computer programmers create and write the programs that operate computers and computer systems. Such programs consist of lines of code written in a programming language, and the lines of code are arranged to create a number of methods or routines which, executed together, form the overall program. Such methods and routines generally utilize a plurality of defined functions that perform specific tasks within the routines and the created program.

Programmers will generally create or write programs within a an integrated development environment that provides tools that enhance a programmers ability to develop a program. Such integrated development environments are programs themselves that are being run in the background as the programmer writes code. Depending upon the language in which the program is written, building block elements are utilized for enhancing the programmers ability to use functions to create specific routines and methods of the program being written. For example, one available integrated development environment is referred to as Visual Age, available from International Business Machines Corporation,. A Visual Age environment, for example, for the JAVA programming language utilizes a JAVA Development Kit or JDK. JDK includes a plurality of building block functions that may be used for creating the various routines or methods of a program.

When computer programs are created and executed, the time required for the program's execution is always a primary concern. While the speed of the hardware in a computer is constantly being improved, it is also a desirable objective for the software programs to be more efficient as well. Generally, programmers will not know the time that is required for execution of their program until they have completed the program and it is formally run or executed. Even then, a determined execution time for a program is only indicative of the time for the entire program to run. Therefore, it is often difficult to pinpoint how a program proceeds and how it might be made more efficient based upon an overall program execution time. For example, inefficient or improper loops might be utilized within the program which significantly increase its execution time. Furthermore, various building block functions are expensive with respect to the specific execution time they require, and thus, such functions increase the overall time to run a particular program. Again, knowing the execution time of the entire program is little help in helping a programmer to pinpoint where inefficient or expensive routines might be eliminated or modified for the purposes of decreasing the overall execution time of the program.

Other performance statistics for a program are also of interest. For example, the instruction count of a program may be indicative of an inefficient program. Furthermore, the number of system cycles per instruction or "cpi" for a program may also highlight inefficiencies. However, such inefficiencies in existing development environments are difficult to pinpoint.

Accordingly, it is an objective of the present invention to enhance the efficiency of software programs.

It is another objective of the present invention to educate a programmer with respect to the efficiency of a program that is being written.

To that end, it is desirable to bring expensive and inefficient functions, routines or methods to the attention of the programmer so that such expensive elements might be avoided or efficiently modified within the program code.

SUMMARY OF THE INVENTION

The present invention addresses the above-objectives by providing an indication to a programmer of the efficiency of a created program that is being written. The indication is provided dynamically while the program is written, and the invention monitors the insertion and deletion of one or more functions within the program being written and determines a performance statistic for the function which is indicative of the efficiency of the function. After the performance statistic is determined, a humanly-perceptible output, such as a message on a display screen, is provided to a programmer and is reflective of the performance statistic of the function. This provides an indication to the programmer related to the efficiency of the created program. In accordance with one embodiment of the present invention, the performance statistic is an execution time statistic which is indicative of the amount of time that the function requires to execute. In alternative embodiments of the invention, the performance statistic might be any statistic which provides an indication with respect to the efficiency of the program, such as an instruction count statistic or a cycles per instruction (cpi) statistic, for example.

In accordance with one embodiment of the present invention, a counter is maintained that is indicative of the cumulative performance statistics associated with a plurality of functions within a created program. The counter is updated when functions are inserted and deleted within the created program, and the output provided to the programmer corresponds to the value of the counter. Thus, the efficiency of a routine or method created by function insertions/deletions may be monitored and an output provided to the programmer. Performance statistics may exist for a plurality of preexisting functions wherein when one of the preexisting functions is inserted or deleted within the program, a preexisting performance statistic is obtained and provided to the programmer. For example, a table of such preexisting performance statistics may exist, and the table may be referred to when a preexisting function is added or deleted within the created program.

In an alternative embodiment of the invention, a performance statistic of a function may be obtained by executing the function in real time, and then based upon the execution of the function a performance statistic is generated for the function.

Preferably, the output corresponding to the performance statistic is displayed on a display screen proximate a line of code entered in the created program which corresponds to a particular function added to the created program. Furthermore, it is desirable to provide the output generally contemporaneously with the insertion or deletion of a function within the created program so that a programmer is aware of inefficient or time consuming function soon after they are inserted in or deleted from the created program.

BRIEF DESCRIPTION OF THE FIGURES

The accompanying drawings, which are incorporated in and constitute a part of this specification, illustrate embodiments of the invention and, together with a general description of the invention given below, serve to explain the principles of the invention.

DETAILED DESCRIPTION

Figure 1:
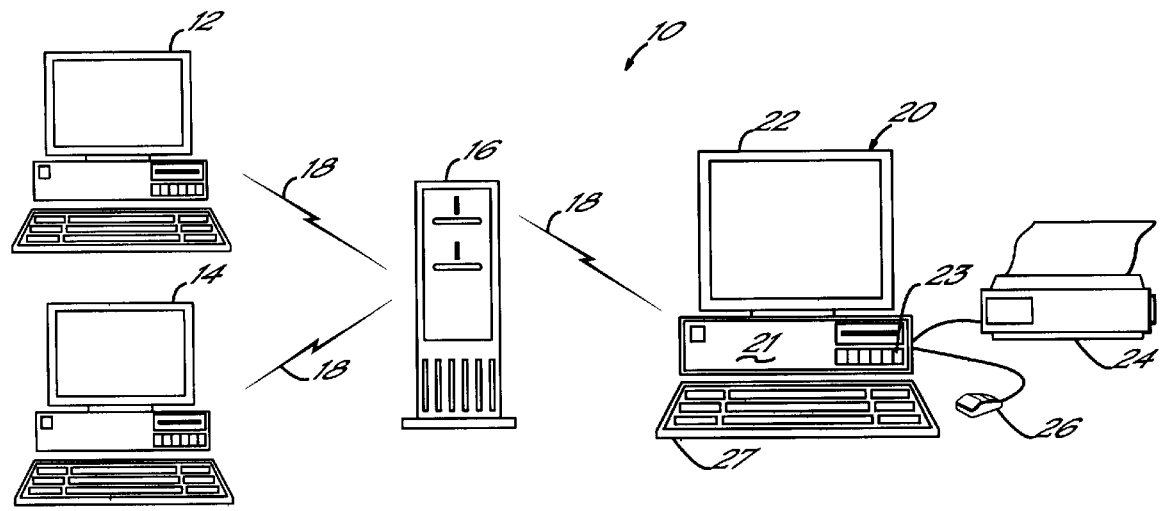
FIG. 1 is a block diagram of a networked computer system consistent with the invention.

The present invention dynamically provides an indication to a programmer the efficiency of the created program that is being written. In that way, a programmer is educated with respect to the efficiency of the program, and inefficient functions, routines or methods may be avoided or efficiently modified within the program code. To that end, the present invention monitors the insertion and deletion within a created program being written by a programmer of at least one function. Generally, insertion and deletion of a plurality of functions is recognized in the invention. A performance statistic for each function is determined. The performance statistic is indicative of a performance parameter function when it executes. A humanly perceptible output, such as a message on a display screen, is provided to the programmer. The output corresponds to the performance statistic of the function to provide an indication to the programmer related to the performance of certain methods and functions when executing the created program.

In accordance with one embodiment of the present invention, an execution time statistic is determined. A counter indicative of the cumulative execution time statistic associate with a plurality of functions in the created program is maintained, and the counter is updated whenever functions are inserted and/or deleted within the created program. The output is provided to the programmer as a counter value which illustrates the cumulative execution time statistics for all the functions or methods which currently exist within the program. Such a counter may exist for each individual routine, method or block of code within a program. Alternatively, an overall counter might be maintained for the entire program such that the execution time statistics for all the functions and methods within the program are reflected in the counter value. For example, execution time statistics for the plurality of preexisting functions may exist within a table, and whenever one of the preexisting functions is inserted and/or deleted within a created program, the table might be referred to for obtaining the execution time statistics for that function. Alternatively, another example of the invention, a function inserted into a program may be executed, in real time, and based upon the execution time, an execution time statistic may be generated for the function and utilized within the dynamic counter of the invention. Preferably, an execution time statistic for a particular function or a cumulative counter of the various functions within the created program with its output proximate to the line of code corresponding to the line of code corresponding to each function inserted into the created program. In that way, the program may determine how each inserted function will effect the program efficiency.

In other embodiments of the invention, other performance statistics for a function, method or routine might be determined in accordance with the invention. For example, the invention may monitor the insertion or deletion of a function and may determine an instruction-count for the function and display an output reflective of such an instruction-count. Still further, the cycles per instruction or cpi statistic might be determined for the function and be reflected in the output. Other performance statistics, not specifically set forth herein, might also be determined and output for use by a programmer in accordance with the principles of the invention.

Hardware and Software Environment

Turning to the Drawings, wherein like numbers denote like parts throughout the several views, FIG. 1 illustrates a computer system 10 consistent with the invention. Computer system 10 is illustrated as a networked computer system including one or more client or remote computers 12, 14 and 20 (e.g., desktop or PC-based computers, workstations, etc.) coupled to server 16 (e.g., a PC-based server, a minicomputer, a midrange computer, a mainframe computer, etc.) through a network 18. Server 16 may serve as the monitoring computer of the invention in one embodiment. Network 18 may represent practically any type of networked interconnection, including but not limited to local-area, wide-area, wireless, and public networks (e.g., the Internet). Moreover, any number of computers and other devices may be networked through network 18, e.g., multiple servers.

Client or remote computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured as computer 20, albeit typically with greater processing performance and storage capacity, as is well known in the art.

Figure 2:
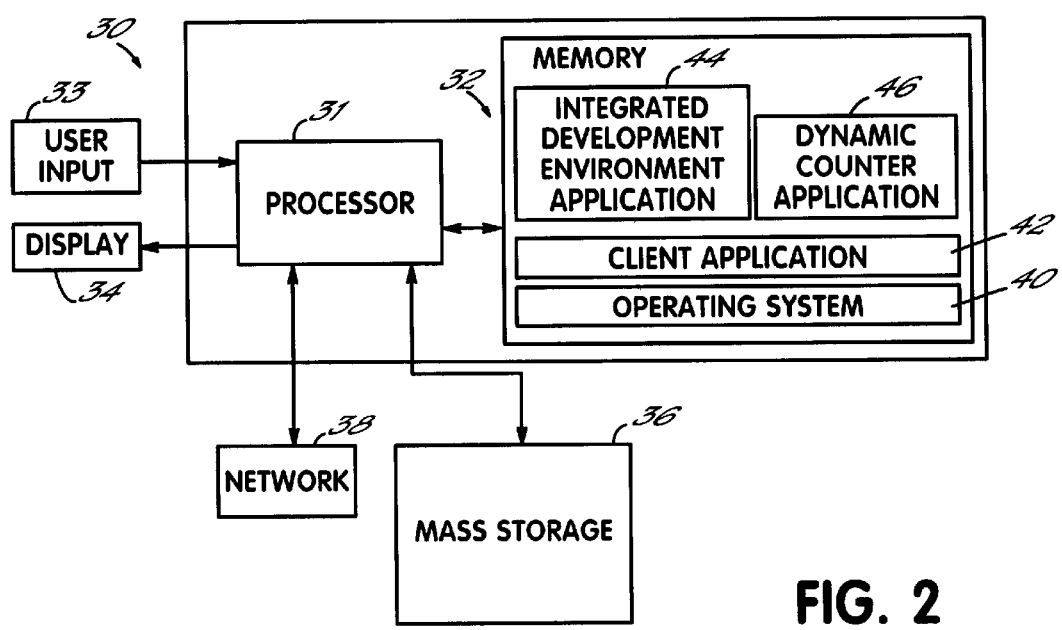
FIG. 2 is a block diagram of an exemplary hardware and software environment for a computer from the networked computer system of FIG. 1.

FIG. 2 illustrates in another way an exemplary hardware and software environment for an apparatus 30 consistent with the invention. For the purposes of the invention, apparatus 30 may represent practically any type of computer, computer system or other programmable electronic device, including a client or remote computer (e.g., similar to computers 12, 14 and 20 of FIG. 1), a server computer (e.g., similar to server 16 of FIG. 1), a portable or palm computer, an embedded controller, etc. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) or other local memory devices comprising the main storage or rapid access memory of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 36 or on another computer coupled to computer 30 via network 38.

Computer 30 also typically receives a number of inputs and outputs for communicating information externally. For interface with a user or operator, such as a computer programmer writing new programs, referred to herein as "created programs", computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). The display will show the computer programmer the lines of code that have been written for the created program. In accordance with one aspect of the present invention, a dynamic indication of the performance statistic for a function added to the created program is displayed proximate the written program code to provide an indication to the programmer related to the performance characteristics of the function, and ultimately, the time required to execute the created program. It should be appreciated, however, that with some implementations of computer 30, e.g., some server implementations, using a server such as server 16, direct user input and output may not be supported by the computer. However, a computer used by a programmer to write a created program will involve a display so that the programmer sees the lines of written code.

For additional storage, computer 30 will usually also include one or more external mass storage devices 36, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 38 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 36 and 38 as is well known in the art.

Computer 30 operates under the control of an operating system 40, and executes or otherwise relies upon various computer software applications, components, programs, objects, modules, data structures, etc. (e.g., client application 42, a program development environment application 44 and a dynamic counter application 46, among others). The integrated development application may be any one of a variety of application programs available to assist a computer programmer in more efficiently writing and creating programs. For example, the Visual Age environment mentioned above might be utilized. Moreover, various applications, components, programs, objects, modules, methods, routines, etc. may also execute on one or more processors in another computer coupled to computer 30 via a network 38, e.g., in a distributed or client-server computing environment, whereby the processing required to implement the functions of a computer program may be allocated to multiple computers over a network.

In general, the routines and functions executed to implement the embodiments of the invention, whether implemented as part of an operating system or a specific application, component, program, object, module, method, routine or sequence of instructions will be referred to herein as "computer programs", or simply "programs". To eliminate confusion, in the description of the invention, the programs, methods or routines being written by a computer programmer, and with which the inventive program will be used, will be referred to herein as "created programs" to distinguish them from the inventive program which provides a dynamic indication of the performance statistics for the created program. The computer programs, whether the inventive program or the created methods, routines and programs that are being written in conjunction with the use of the inventive program, typically comprise one or more instructions that are resident at various times in various memory and storage devices in a computer, and that, when read and executed by one or more processors in a computer, cause that computer to perform the steps necessary to execute steps or elements embodying the various aspects of the invention. For a created program written by a programmer, the instructions may be in the form of pre-defined functions in a particular programming language. As discussed further hereinbelow, the present invention monitors when functions, or lines of code creating a function, are added and deleted from a created program and provides a dynamic indication of a performance statistic, such as an execution time statistic, associated with the function to provide a programmer with an indication of how long a function, method or routine, and ultimately the overall program, will take to execute and how efficient a method, routine or program is.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links, including the Internet.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Dynamic Counter Application

A program which is being written or created by a programmer is a sequence of instructions which are generally grouped together as functions. The functions are accessed within the created program by "calls" to those functions. For example, a series of preexisting functions may exist within a programming language wherein the functions perform certain tasks. The groups of functions and other instructions are usually grouped together to form units which are often referred to as routines, methods or modules. Various routines, methods and modules are then grouped together to make up the overall created program. It will be readily understood that the nomenclature utilized to describe the various groups of program code and instructions of a created program (i.e., function, method, module, and routine) are for the purposes of illustration only and are not meant to be limiting with respect to the other aspects of the present invention. For example, while the invention might be utilized to provide a comprehensive performance statistic for a completed program, it is anticipated that the program will be very valuable in isolating and monitoring specific methods or routines within an overall larger program. As used herein, the term "created program" will also refer to and encompass a particular method or routine or multiple methods and routines within a larger program. That is, the invention may be used with only parts of a program and not the entire program.

To assist a computer programmer, the integrated development environment application 44, such as Visual Age mentioned above, provides the development environment through which a created program may be written by a programmer. For example, utilizing the JAVA language, a JAVA Development Kit, or a JDK, might be utilized that includes a plurality of building block functions. The programmer writes the created program by writing lines of code and function calls to the various building block functions of the JAVA Development Kit. The present invention then tracks the program code written by the programmer to monitor the code and specifically monitor the insertion and deletion of one or more functions within the code. Upon determining the insertion or deletion of a function, a performance statistic, such as an execution time statistic, for the function is determined wherein the performance statistic is indicative of the amount of time that the function requires to execute. For example, an execution time statistic is a measurement of the amount of time that the function will require when it is run or executed. Other performance statistics such as instruction counts or cycles per instruction (cpi) may be used to indicate the efficiency of a function, method or routine. A humanly-perceptible output to the programmer, such as a message on the screen of a display, is then provided which corresponds to the performance statistic of the function. The output provides an indication to the programmer related to the time required to execute the created program and/or the overall efficiency of the created program.

In one embodiment of the invention, a dynamic counter is maintained and the counter is updated each time that a function call is added to the lines of code making up the created program written by the programmer. Therefore, the dynamic counter provides an ongoing and dynamic count of the performance statistics of the program. For example, an execution time statistic might be given in a unit of time such as milliseconds or seconds. In that way, the programmer can spot expensive or time consuming routines, methods and functions making up the created program, and might also detect, for example, a bad loop in the created program which is considerably expensive with respect to the execution time of the created program. In one embodiment of the invention, a plurality of preexisting performance statistics might be associated with a plurality of preexisting functions, such as building block functions within a JAVA Development Kit. When a preexisting function is inserted or deleted within the program, a dynamic counter is adjusted by the associated preexisting performance statistic for that preexisting function. In one example of the invention, a table might be maintained for the various preexisting functions such that when the function is inserted and/or deleted, the table will provide the associated performance statistic for that preexisting function. Alternatively, as a function is added in the created program, a real time performance estimate might be made by executing the function, wherein a performance statistic, such as an execution time statistic for the function, is generated based upon the time required to execute the function in real time. Of course, other performance statistics besides time statistics might be generated in real time as well. Preferably, the output corresponding to the counter is provided on a display proximate to the lines of code corresponding to the function or functions and is displayed shortly after the particular function has been written into the lines of code of the created program.

Figure 3:
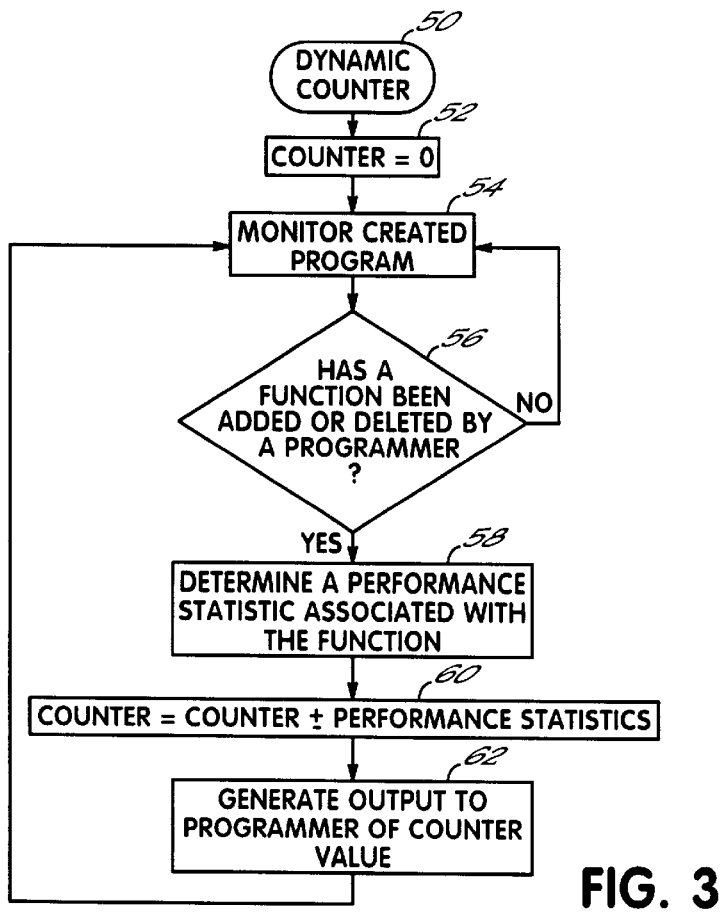
FIG. 3 is a flowchart illustrating the program flow of a program in accordance with the present invention.

FIG. 3 is a flowchart of one embodiment of the invention wherein the dynamic counter program is started (block 50) and runs in real time as part of the development environment, for example, as the programmer writes lines of code for the created program. For a particular method, routine or other block of code within a created program or for the entire created program, a counter is established and initialized (block 52) to begin monitoring program creation within a run time environment. As discussed herein, the dynamic counter of the invention may be designated for individual blocks of code, to evaluate a particular routine or method, for example. Individual method monitoring will generally be most desirable from the standpoint of a programmer. Alternatively, the programmer may desire to only have it reflect a cumulative statistic for the entire program. The created program, in whatever form (e.g, method, routine, complete program), is monitored (block 54) to determine whether a function has been added or deleted by a programmer (block 56). Not all lines of code will be recognized by the dynamic counter program. Rather, in one embodiment of the invention, a set of preexisting functions are recognized. Each time one of the preexisting functions is inserted into or deleted from a created program, the counter is updated. If no preexisting functions are added or deleted, the dynamic counter program continues to monitor the created program (block 54). If a function recognized by the dynamic counter program has been added to or deleted from a created program by a programmer, a performance statistic for the function is determined (block 58). The performance statistic is indicative of the amount of time that the function requires to execute and/or the overall efficiency of the function. The performance statistic may be any statistic which is reflective of the performance and/or efficiency of the function. For example, execution time, instruction counts and cpi statistics might be utilized. Other performance statistics might be utilized as well. Furthermore, the term "function" as used herein refers to a specific and defined instruction or instruction set and is not limited to a single function. For example, a function inserted in to the created program may call other functions, methods or routines. Therefore, the term function is not limited to a particular form, but rather indicates an instruction or set of instructions for a computer, which will be recognized by the invention as a unit to be monitored for determining a performance statistic. For example, in one embodiment of the invention, a plurality of preexisting execution time statistics could be maintained within a table to be associated with a plurality of preexisting functions when one or more of those functions are placed in a created program. When the dynamic counter program recognizes a preexisting function being added to or deleted from the created program, the preexisting function is associated with the preexisting execution time statistic. This may be done by referring to the table which includes all of the various preexisting time statistics for preexisting time functions. In accordance with another aspect of the present invention, the function added to or deleted from the created program might be executed in real time. Then, based upon the real time execution, an execution time statistic might be generated for the function and utilized by the dynamic counter program. Therefore, various ways might be used to determine a performance statistic associated with a function as noted in block 58. When the performance statistic is determined, such as by being obtained from a table, the counter is updated (block 60). If a function is added to the created program, the performance statistic for the function is added to the value of the counter. Conversely, if a function is removed or edited out of the created program, the performance statistic is subtracted from the current value of the counter. In accordance with one aspect of the present invention, a single overall counter might be maintained for the entire created program. Alternatively, individual counters might be maintained for individual methods, routines or blocks of code within the created program. In still another alternative, individual blocks or routine counters might be utilized while an overall counter might also be utilized. For example, an overall counter for the entire created program might be nothing more than the addition of all of the individual counters for separate blocks of code or routines.

An output is generated, such as by displaying a value on a display screen, and the output corresponds to or is reflective of the performance statistic of a function. That is, for a dynamic counter, the output would correspond to the current value of the counter as it is continually updated for the performance statistics of functions which are recently added to or deleted from the created program. In that way, an indication is provided to the programmer which is related to the time required to execute the created program and/or the overall efficiency of the created program. Again, the counter of the invention might provide a counter for a block of code or a method or routine or may provide an overall counter for the entire program. In either way, the output, which is reflective of and is updated according to the performance statistic of the functions which are added to or deleted from the created program, provides an indication to the programmer that is related to or reflective of the time required to execute the created program and/or the efficiency of the created program. Since some of the code will not be associated with a specific function or specific performance statistic, the dynamic counter of the invention will generally not be 100% accurate due to the execution time for some uncounted lines of code. However, the dynamic counter of the invention provides the programmer with a representative output which is representative of the performance statistic of added/deleted functions and, ultimately, the overall time required to execute the created program or routine and/or the efficiency of the created program. The claims of the patent hereinafter refer to the created program. However, if the output is maintained for each routine or smaller block of code, then the words "created program" may refer to the smaller block of code or method or routine which makes up part of a completed program rather than to the larger, completed program. To that end, the term "created program" may mean a large complete program or smaller routines, methods or programs within the larger complete program.

Preferably, the output corresponding to the execution time statistic of a function is provided proximate to the lines of code corresponding to the function. In that way, the programmer may readily see the effect which certain lines of code are having on the overall execution time and efficiency of the program. Furthermore, the humanly perceptible output, such as a display screen message, preferably occurs or is displayed shortly after a function is inserted and/or deleted in the program. That is, the counter occurs dynamically with respect to the created program being written by a programmer.

As one example of the invention, actual performance statistics could be determined from a profiled set of previous function runs or routine runs which then may be imported into the development environment, such as from a stored table. For example, a set of test cases could be developed for all of the building block functions or routines. The test cases are then run on a machine and profiled with performance statistics and saved in a table for later reference. Again, in the present invention, and specifically with respect to the claims, the term "function" is used to refer to any line of code or lines of code which operate to perform a specific function. For example, the function might correspond to one line of code or one word. Alternatively, the term "function" might refer to multiple lines of code, which may be categorized as a routine or method wherein an execution time statistic is determined for the entire routine or method: rather than the individual lines of code within that routine. Furthermore, a "function" might, in turn, be made of a plurality of functions. In that way, the term "function" is not limited to a specific single function, but rather may be plural functions or sub-functions or methods/routines which make up an overall larger function.

Referring to FIG. 3, the output is generated according to block 62 for the programmer to view the current counter value and, thus, have an indication as related to or reflective of the time that is required to execute the created program and its performance efficiency. The dynamic counter program continues to monitor the created program (block 54) until it is completed.

In accordance with another aspect of the present invention, a particular counter for a function or for a routine involving numerous sub-functions or methods/routines may be updated based upon statistics determined when the function is run by a programmer. In that way, the execution time statistic will be more accurate for a particular function. When a method or routine is run, Performance Explorer AS400 provides run time statistics which are incorporated into IDE. For example, the "function" may be run within a Performance Explorer environment in an IBM AS400, which provides run time or performance statistics. The run time or performance statistics, such as execution time, instruction counts, cpi statistics, and other statistics obtained may then be imported over into the integrated development environment and utilized with the invention, for example.

Figure 4:
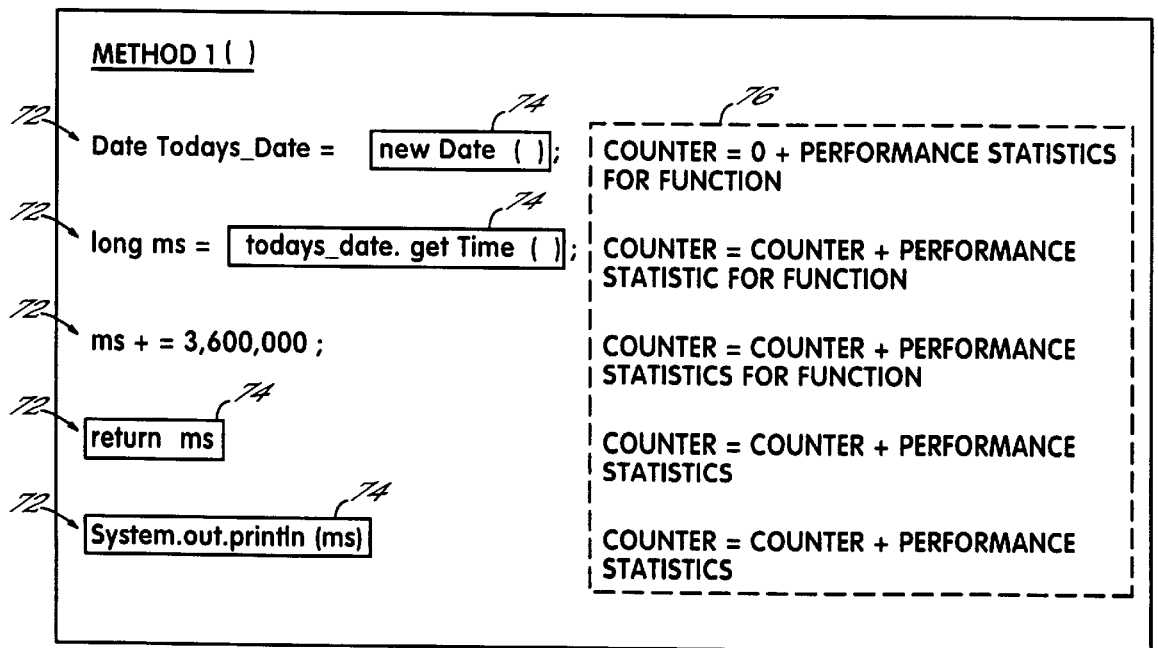
FIG. 4 is a textual portion of a created program written by a programmer showing numerous functions and illustrating the dynamic indication of the performance statistics for the functions in the created program.

FIG. 4 provides one example of the present invention. On a display screen 70, lines of code 72 are written by a programmer wherein the various lines of code make up the program to be created which is entitled Method 1( ). Method 1( ) may be the complete created program, or it may be a building block routine for an overall larger created program. Various lines 72 of code utilize functions which are blocked off and designated with reference to numeral 74. Those functions are preexisting functions which are correlated with performance statistics, such as execution time statistics, which are indicative of or reflective of the amount of time that each function would require to execute. As a first line of code is written, the function new Date( ) is utilized, and a counter is updated with the associated performance statistic for the new Date( ) function. A dashed block 76 to the right of the lines of code 72 in FIG. 4 illustrates the humanly-perceptible (i.e., visual) value of the counter for the programmer. The line of code associated with the new Date( ) function is updated from a zero value to add the performance statistic for the new Date( ) function. The counter value is shown to a programmer as illustrated with block 76 next to the line of code. However, the output might be in another form, such as in a separate window associated with the present invention.

In the next line of code, the function todays_date.getTime( ) is reflected by a counter value again updated by adding the performance statistic for that function. Similarly, the counter is updated with performance statistics for the "return ms" function as well as the "System.out.println(ms)" function. In that way, the counter is constantly updated and displayed for each new function added to the Method 1( ) created program. Of course, if various functions are removed by the programmer during subsequent revisions of the created program, the counter would be updated by subtracting the performance time statistic associated with the function that has been deleted. A counter value could be displayed for each line as shown or may only be associated with the last line of code, such as a cumulative counter value after the System.out.println(ms) function.

The present invention helps a programmer to identify costly or inefficient routines and methodologies which have been inserted into a created program based upon the functions which are inserted into such routines and methodologies. For example, the following void method1( ) may have been avoided because of the loop which repeats the new Date( ) function ten times.

```
void method1( )
for (int xx=0; xx<10; xx++)
Date todays_date=new Date( );
Date file_date=getNextDateFromFile(xyz);
if (todays_date.after(file_date))
System.out.println("In the Future")
```

In addition to inefficient loops, other functions might be flagged, such as a time consuming "+" function. In that way, the following String method2( ) would be tracked by the dynamic counter of the invention such that all of the expensive "+" functions are indicated.

```
String method2( )
String str=month+'/'+day+'/'+year;
String time=hour+':'+minutes+':'+seconds
return str+time
```

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method for dynamically providing an indication to a programmer of the efficiency of a created program as that program is being written, the method comprising:
   (a) generally simultaneous with the writing of software code by a programmer for the created program, monitoring the insertion and deletion, within the created program, of software code reflective of at least one function added to or removed from the program;
   (b) determining a performance statistic for the function associated with the software code which is indicative of the efficiency of that function;
   (c) providing a humanly-perceptible output to the programmer, the output being reflective of the performance statistic of the function to provide an indication to the programmer related to the efficiency of the created program.

2. The method of claim 1 further comprising the steps of:
   (a) maintaining a counter indicative of the cumulative performance statistics associated with a plurality of functions in the created program;
   (b) updating the counter when functions are inserted and deleted by the insertion or deletion of software code within the created program;
   (c) providing a humanly-perceptible output corresponding to the counter.

3. The method of claim 1 wherein said function is a preexisting function and the method step of determining an performance statistic for the function further comprises the steps of:
   (a) associating a preexisting function with a preexisting performance statistic;
   (b) when the preexisting function is one of inserted and deleted within the program by software code, obtaining the associated preexisting performance statistic to provide the indication to the programmer.

4. The method of claim 3 further comprising maintaining, within a table, a plurality of preexisting performance statistics associated with a plurality of preexisting functions, the method step of associating a preexisting function with a preexisting performance statistic further comprising the step of:
   (a) referring to the table when preexisting functions are added and deleted in software code within the created program.

5. The method of claim 1 wherein said method step of determining a performance statistic for the function comprises the step of:
   (a) in real time, executing the function;
   (b) based upon the execution of the function, generating a performance statistic for the function.

6. The method of claim 1 further comprising:
   (a) providing the output corresponding to the performance statistic of the function proximate to the line of software code corresponding to the function.

7. The method of claim 2 further comprising:
   (a) providing the output corresponding to the counter proximate to the lines of software code corresponding to the functions.

8. The method of claim 1 wherein the step of providing a humanly-perceptible output corresponding to the execution time statistic of the function occurs shortly after a function is one of inserted and deleted in software code within the program.

9. The method of claim 1 wherein said performance statistic is an execution time statistic which is indicative of the amount of time that the function requires to execute.

10. The method of claim 1 wherein said performance statistic is an instruction count statistic indicative of the number of instructions associated with the function.

11. The method of claim 1 wherein said performance statistic is a cycles per instruction statistic which is indicative of the number of system cycles associated with instructions of the function.

12. An apparatus for dynamically providing an indication to a programmer of the efficiency of a created program as that program is being written, the apparatus comprising:
   (a) a memory; and
   (b) a program resident in memory, the program configured for, generally simultaneous with the writing of software code by the programmer for the created program, monitoring the insertion and deletion, within the created program of software code reflective of at least one function added to or removed from the program, and determining a performance statistic for the function associated with the software code which is indicative of the efficiency of the function, the program further configured for providing a humanly-perceptible output to the programmer, the output being reflective of the performance statistic of the function to provide an indication to the programmer related to the efficiency of the created program.

13. The apparatus of claim 12 wherein the program is configured for maintaining a counter indicative of the cumulative performance statistics associated with a plurality of functions in the created program and updating the counter when functions are inserted and deleted by the insertion or deletion of software code within the created program, the program further providing a humanly-perceptible output corresponding to the counter.

14. The apparatus of claim 12 wherein said function is a preexisting function and the program is further configured for associating a preexisting function with a preexisting performance statistic, and when the preexisting function is one of inserted and deleted by software code within the created program, obtaining the associated preexisting performance statistic to provide the indication to the programmer.

15. The apparatus of claim 14 wherein the program is further configured for maintaining within a table a plurality of preexisting performance statistics associated with a plurality of preexisting functions, and referring to the table when preexisting functions are added and deleted in software code within the created program.

16. The apparatus of claim 12 wherein said program is further configured for determining a performance statistic for the function by executing, in real time, the function and, based upon the efficiency of the function, generating a performance statistic for the function.

17. The apparatus of claim 12 wherein a line of created program code corresponding to the insertion of a function in the created program is displayed on a display device, the program further providing the output corresponding to the performance statistic of the function on the display device proximate to the line of software code corresponding to the function.

18. The apparatus of claim 13 wherein a line of created program code corresponding to the insertion of functions in the program is displayed on a display device, the program further providing the output corresponding to the counter on the display device proximate to the line of software code corresponding to the functions.

19. The apparatus of claim 12 wherein the program is further configured to provide a humanly-perceptible output corresponding to the execution time statistic of the function shortly after a function is one of inserted and deleted in software code within the created program.

20. The apparatus of claim 12 wherein said performance statistic is an execution time statistic which is indicative of the amount of time that the function requires to execute.

21. The apparatus of claim 12 wherein said performance statistic is an instruction count statistic indicative of the number of instructions associated with the function.

22. The apparatus of claim 12 wherein said performance statistic is a cycles per instruction statistic which is indicative of the number of system cycles associated with instructions of the function.

23. A program product for dynamically providing an indication to a programmer of the efficiency of a created program as that program is being written, the program product comprising:

(a) a program configured for, generally simultaneous with the writing of software code by a programmer for the created program, monitoring the insertion and deletion, within the created program of software code reflective of at least one function added to or removed from the program, and determining a performance statistic for the function associated with the software code which is indicative of the efficiency of the function, the program further configured for providing a humanly-perceptible output to the programmer, the output being reflective of the performance statistic of the function to provide an indication to the programmer related to the efficiency of the created program;

(b) a signal bearing media bearing the program.

24. The program product of claim 23 wherein the signal bearing media comprises at least one of a recordable media and a transmission type media.

25. The program product of claim 23 wherein the program is configured for maintaining a counter indicative of the cumulative performance statistics associated with a plurality of functions in the created program and updating the counter when functions are inserted and deleted by the insertion or deletion of software code within the created program, the program further providing a humanly-perceptible output corresponding to the counter.

26. The program product of claim 23 wherein said function is a preexisting function and the program is further configured for associating a preexisting function with a preexisting performance statistic, and when the preexisting function is one of inserted and deleted by software code within the created program, obtaining the associated preexisting performance time statistic to provide the indication to the programmer.

27. The program product of claim 26 wherein the program is further configured for maintaining within a table a plurality of preexisting execution time statistics associated with a plurality of preexisting functions, and referring to the table when preexisting functions are added and deleted in software code within the created program.

28. The program product of claim 23 wherein said program is further configured for determining a performance statistic for the function by executing, in real time, the function and, based upon the execution of the function, generating a performance statistic for the function.

29. The program product of claim 23 wherein a line of created program code corresponding to the insertion of a function in the created program is displayed on a display device, the program further providing the output corresponding to the execution time statistic of the function on the display device proximate to the line of software code corresponding to the function.

30. The program product of claim 23 wherein said performance statistic is an execution time statistic which is indicative of the amount of time that the function requires to execute.

31. The program product of claim 23 wherein said performance statistic is an instruction count statistic indicative of the number of instructions associated with the function.

32. The program product of claim 23 wherein said performance statistic is a cycles per instruction statistic which is indicative of the number of system cycles associated with instructions of the function.

* * * * *